United States Patent Office

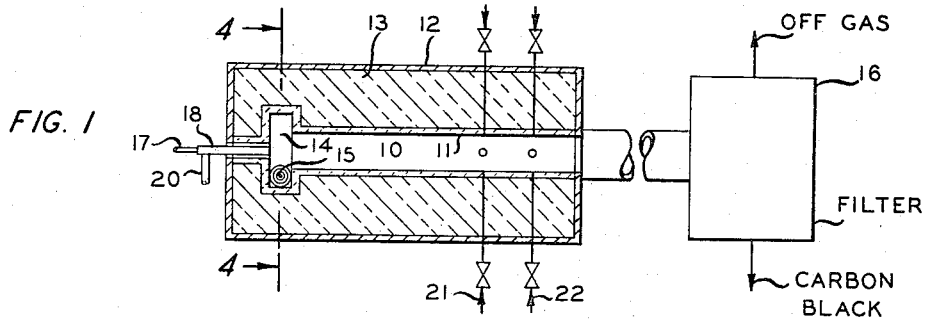
FIG. 1
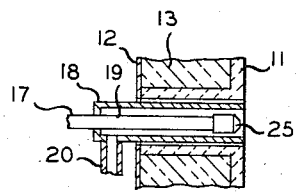
FIG. 2
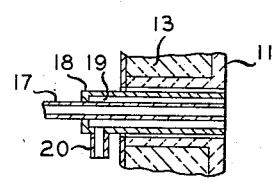
FIG. 3
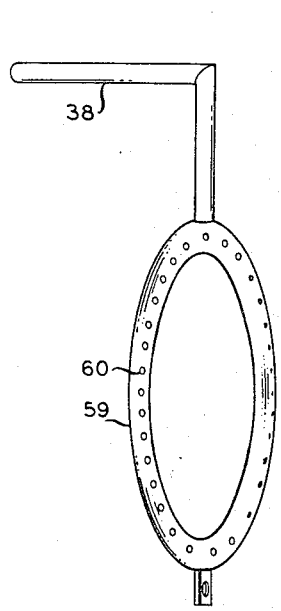
FIG. 7
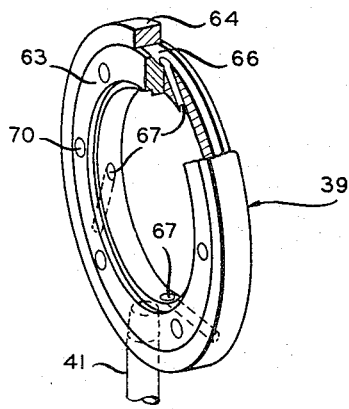
FIG. 4
FIG. 6
INVENTOR.
A. F. STEGELMAN

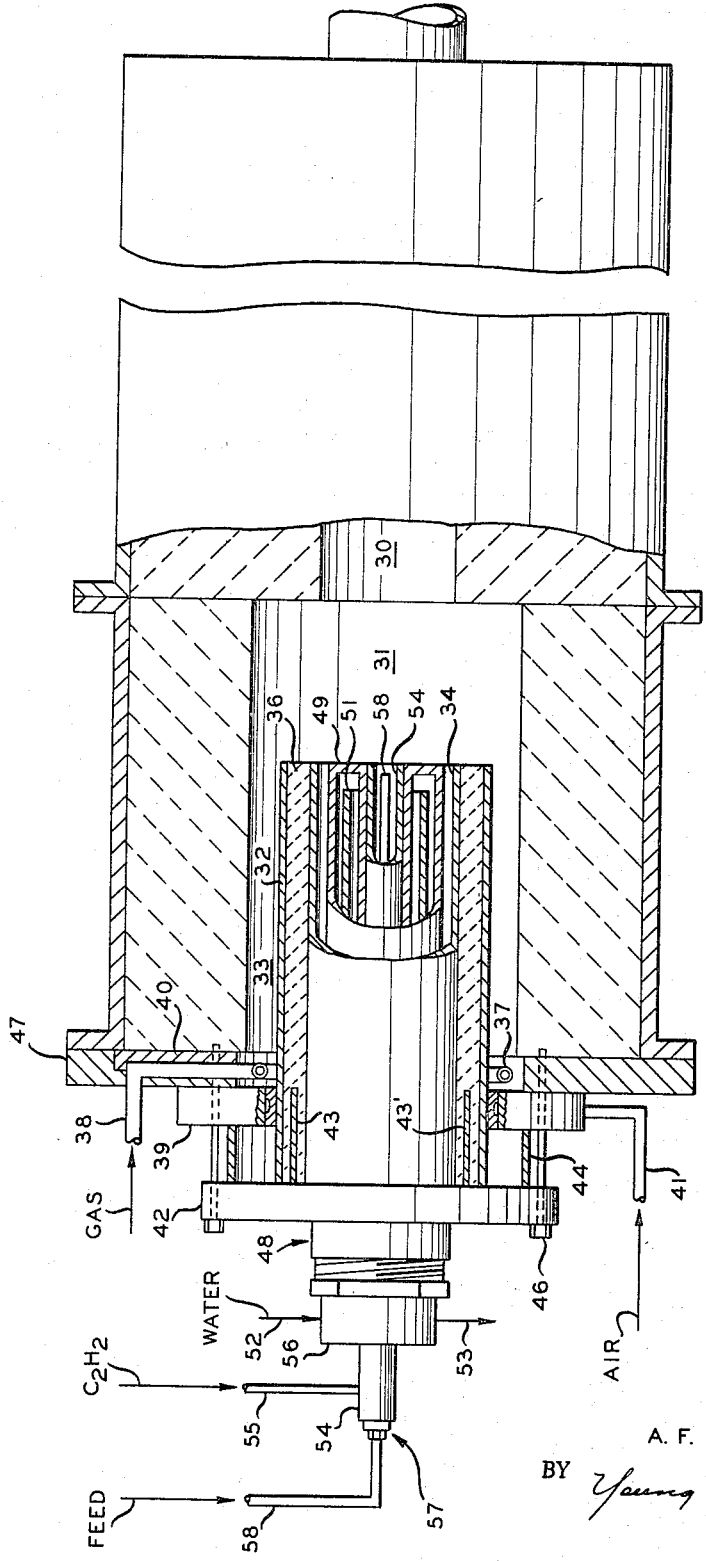

3,376,111
Patented Apr. 2, 1968

3,376,111
PRODUCTION OF HIGH STRUCTURE
FURNACE CARBON BLACK
Albert F. Stegelman, Bartlesville, Okla., assignor to
Phillips Petroleum Company, a corporation of
Delaware
Filed Aug. 17, 1964, Ser. No. 389,930
11 Claims. (Cl. 23—209.4)

ABSTRACT OF THE DISCLOSURE

Production of a high structure furnace carbon black from a hydrocarbon feedstock by introducing a stream of said feedstock into a body of hot combustion gases in a carbon black furnace, introducing around said stream of feedstock a sheath of a predominantly acetylene gas, and recovering said carbon black from the effluent from said furnace.

---

This invention relates to the production of high structure furnace carbon blacks. In one aspect this invention relates to a process for the production, from a hydrocarbon feedstock, of a furnace carbon black having higher structure characteristics than the carbon black normally produced from said feedstock. In another aspect this invention relates to an apparatus which can be employed in the production of said furnace carbon blacks.

For several years carbon black has been produced in large quantities in furnaces. For example, it is known in the prior art to produce carbon black by directing a hot oxidizing or combustion gas in a generally helical path adjacent the periphery of a generally cylindrical reaction zone and directing a reactant material axially into said zone inside the helically-moving mass of hot gas. The reactant is thereby rapidly heated to a carbon black-forming temperature and reacted in said zone to form carbon black, which is subsequently recovered. Processes of this type are known as tangential flame processes and are illustrated in U.S. Patents 2,375,795, 2,375,796, 2,375,797, and 2,375,798 (1945). Another tangential flame type process is disclosed in U.S. Patent 2,564,700 (1951) which involves the injection of a combustible mixture of fuel and oxidizing gas circumferentially into a combustion zone and the reaction of the mixture by combustion near the periphery of said zone. The resulting combustion gas, at a high temperature, travels in a generally spiral path toward the axis of the combustion zone and is then directed in a generally helical path adjacent the periphery of a reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is reacted within the reaction zone to form carbon black, which is subsequently recovered. This type of tangential flame process is known as a precombustion process, since the hot gas is substantially completely formed by combustion prior to contact with the reactant.

The reaction mixture formed in processes of the type above described comprises a suspension of a carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur.

In said tangential flame processes, there is introduced coaxially with the stream of carbonaceous reactant a separate relatively small stream of air. In the prior art this stream of air is known as "jacket air" and is introduced as an annular stream through an annular space provided around the reactant hydrocarbon feed tube. Jacket air passing through said annular space is intended to keep the inner end of the hydrocarbon reactant feed tube cool and prevent deposition of carbon thereon or, if carbon does deposit on the end of said tube, to assist in its removal by combustion. However, said jacket air is not essential to the process.

The larger part of the carbon black produced today is used as a reinforcing agent for rubber. By far the larger part of the compounded rubber material containing carbon black is designed specifically for tire treads or tire carcasses. The state of the rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a close correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black is meant characteristics of the carbon black particles which relate to flocculation of said particles. The structure is said to be high when there is a strong tendency for the particles to form chains of particles. Conversely, the structure is said to be low when there is little tendency to form such chains. "High structure" carbon black is generally considered in the prior art to have an oil absorption of about 1.35 to 1.45 cc. per gram and this is the usual range for prior art furnace blacks. "Normal structure" carbon black is generally considered in the prior art to have an oil absorption of about 0.75 to 1.2 cc. per gram and in the prior art such blacks have generally been made by the channel black process. "Low structure" carbon black is generally considered in the prior art to have an oil absorption of about 0.45 to 0.55 cc. per gram and in the prior art such blacks are made by the thermal process. Each of these blacks has certain applications for which it is preferred.

Since it is not convenient to measure the structure directly, the oil absorption of the black is commonly used as a "measure" of the structure. It has been found that the oil absorption of a carbon black correlates well with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

Furnace carbon blacks having high structure characteristics have several advantages in the compounding of rubber. For example, they are "easy processing," i.e., (are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes. I have now discovered a method for increasing the structure of a carbon black product produced in a furnace process from hydrocarbon feedstocks.

This is accomplished by the substitution of acetylene for said "jacket air."

Thus, broadly speaking, the present invention resides in a process for producing a furnace carbon black having increased high structure characteristics from a hydrocarbon feedstock by introducing separate but coaxial and contiguous streams of (1) said feedstock and (2) a predominantly acetylene gas into a body of hot combustion gases in a carbon black furnace, and recovering said carbon black from the effluent from said furnace; and an apparatus which can be employed in the practice of the invention.

An object of this invention is to provide valuable carbon blacks and methods of making the same. Another object of this invention is to provide a process for producing a furnace carbon black having increased structure characteristics or oil absorption values. Another object of this invention is to controllably increase the structure characteristics or oil absorbtion value of a furnace carbon black produced by the decomposition of a hydrocarbon in a carbon black furnace. Still another object of this invention is to provide a process for making a furnace carbon black, from a given hydrocarbon feedstock, having higher structure characteristics than the carbon black which normally would be produced from said hydrocarbon feedstock. Another object of this invention is to provide an apparatus which can be employed to produce furnace carbon blacks having increased structure characteristics. Other aspects, objects, and advantages of the invention will be apparent to those skilled in the art in view of this disclosure.

Thus, according to the invention, there is provided a process for producing a furnace carbon black product having increased structure characteristics, which process comprises: establishing and maintaining in a furnace a zone of hot combustion gases formed by burning a fuel with a free oxygen-containing gas; introducing into said zone a stream of hydrocarbon feedstock; introducing around said stream of hydrocarbon feedsock a sheath of a predominantly acetylene gas; forming carbon black from said hydrocarbon feedstock by pyrochemical action due to the heat of said hot combustion gases, and separating the resulting carbon black product from the resulting gaseous products of said process.

It will be noted that the predominantly acetylene gas is introduced in a manner so as to surround the hydrocarbon feedstock stream so that said hot combustion gases contact said predominantly acetylene gas stream prior to contacting said hydrocarbon feedstock stream. This is an important aspect of the invention because, as shown hereinafter in the examples, when the predominantly acetylene gas stream is mixed with the hydrocarbon feedstream the improved carbon blacks of the invention are not obtained.

The furnace carbon blacks produced in accordance with the invention are characterized by higher than normal modulus properties in rubber, i.e., said carbon blacks impart modulus values to rubber which are higher than what would normally be expected from a furnace carbon black produced from the feedstock used. The feedstock may be one that in the absence of this invention usually yields a high modulus carbon black, or the feedstock may be one that usually yields a normal modulus carbon black. It is also within the scope of the invention to produce higher than normal modulus furnace blacks from feedstocks which usually yield what is generally considered a low modulus carbon black. In any event, the carbon black produced in the practice of the invention is characterized by a higher modulus in rubber than would be expected to be produced from the feedstock being used.

Thus, herein and in the claims, unless otherwise specified, the term "higher than normal modulus" when applied to a furnace carbon black, refers to a carbon black which when compounded in rubber imparts a modulus property to said rubber which is higher than would be expected for a carbon black produced from the particular feedstock being used.

The presently preferred feedstocks for use in the practice of the invention are the normally liquid hydrocarbons such as benzene, and aromatic concentrate oils such as those prepared by the liquid sulfur dioxide extraction of catalytically cracked gas oils. However, aromatic concentrate oils used in the production of the carbon blacks of the invention can include oils other than extract oils produced by the liquid sulfur dioxide extraction of cycle oils. Typical properties of conventional aromatic concentrate oils which can be used in the practice of the invention are: boiling range, 400–1000° F.; BMCI, 75 to 140; and an API gravity of from about 0 to about 20°. It is preferred that the normally liquid hydrocarbon feedstocks used in the practice of the invention have a BMCI value of at least 80.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. The feed can be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates can be used. These charge stocks may contain most any class of hydrocarbon compound, as for example, saturated or unsaturated hydrocarbons, paraffins, olefins, aromatics, naphthenes or any others which might become available.

The predominantly acetylene gas utilized in the practice of the invention is preferably essentially pure acetylene. However, in some instances where such a stream is available it is sometimes preferred to utilize mixtures of acetylene with other unsaturated gases such as ethylene and propylene. Such mixtures are frequently available as "waste" gas streams from refinery or other petroleum processing operations. When such mixtures of gases are utilized the mixture should contain at least 60 to 70 volume percent or more acetylene, can contain up to 30 to 40 volume percent ethylene, can contain up to 20 to 25 volume percent propylene, and not more than 5 volume percent of the $C_1$ to $C_3$ saturated hydrocarbon gases, methane, ethane, and propane. When it is necessary or desirable to use a mixture of said unsaturated gases in the practice of the invention, ethylene is preferred over propylene as a constituent of said mixture.

In the practice of the invention the predominantly acetylene gas stream is usually used in an amount which is sufficient to provide from about 10 to about 45 standard cubic feet per gallon of hydrocarbon feedstock. The amount of said gas stream utilized is preferably an amount which is within the range of from substantially stoichiometric to 200 percent of stoichiometric, more preferably from substantially stoichiometric to 160 percent of stoichiometric, with respect to the excess oxygen in the free oxygen-containing gas used in producing the hot combustion gases utilized in the practice of the invention. Said hot combustion gases are formed by burning a fuel, e.g., natural gas, ethane, propane, etc., with an excess of a free oxygen-containing gas. The amount of said excess air is usually within the range of from 115 to 170, preferably 130 to 170 percent of stoichiometric. Although gas fuels are preferred for use in the production of said hot combustion gases, it is within the scope of the invention to burn other fuels such as liquid hydrocarbon fuels to produce said hot combustion gases.

FIGURE 1 is an illustration, partly in cross-section, of one form of apparatus which can be employed in the practice of the invention.

FIGURE 2 is a view, partly in cross-section, of a portion of one form of the furnace illustrated in FIGURE 1.

FIGURE 3 is a view in cross-section of a portion of another form of the furnace illustrated in FIGURE 1.

FIGURE 4 is a view, partly in cross-section, taken along the lines 4—4 of FIGURE 1.

FIGURE 5 is a view, partly in cross-section, of another furnace which can be employed in the practice of the invention.

FIGURE 6 is a perspective view of the air inlet ring of the furnace shown in FIGURE 5 with parts of said ring broken away to show details of construction.

FIGURE 7 is a perspective view of the fuel gas supply ring of the furnace of FIGURE 5.

Referring now to the drawings, wherein like reference numerals have been employed to denote like elements, the invention will be more fully explained. FIGURE 1 illustrates in diagrammatic form the general structure and general shape of one presently preferred type of carbon black furnace and associated apparatus which can be employed in the practice of the invention. In said FIGURE 1 there is shown a reaction section 10 having a refractory lining 11 made of a highly refractory material such as sillimanite, alumina, or other refractory materials suitable for the purpose. A steel shell 12 containing insulating material 13 surrounds said refractory liner. At the inlet end of the furnace there is a short section 14 having a diameter considerably larger than the diameter of reaction section 10. This larger diameter section 14 is essentially a combustion chamber in which a combustible mixture of a gas, such as natural gas, and an oxygen-containing gas, such as air, is burned. Said combustible mixture is injected into said combustion chamber 14 through an inlet tube 15 which is so positioned that the gases enter said combustion chamber in a direction tangent to the cylindrical wall thereof. Upon continued injection of the combustible mixture, the flame and combustion products follow a spiral path toward the axis of said combustion chamber 14. When the spiral becomes less than the diameter of reaction section 10, the gaseous flow changes from a spiral to a helix, and following this latter pattern the gases enter said reaction section 10, remain adjacent the wall thereof, and finally pass into the carbon black recovery apparatus 16.

Reactant hydrocarbon, from a source not shown, passes through a preheater, also not shown, and finally passes through feed conduit 17 which is arranged axially so that feed introduced therethrough will be introduced along the axis of said combustion chamber 14. Surrounding said feed conduit 17 is a larger conduit 18, called an "air jacket" in the prior art, but referred to in the practice of this invention as a "gas jacket." The arrangement of said two conduits 17 and 18 defines an annular space 19 (see FIGURES 2 and 3) through which the jacket gas is passed into the furnace. In the practice of this invention the predominantly acetylene gas is introduced via conduit 20 and passed through annular space 19 to provide an annular sheath surrounding the hydrocarbon feedstock emerging from conduit 17. By this manner of introduction the hot combustion gases contact said acetylene gas prior to contacting the hydrocarbon feedstock.

It is not essential that the downstream end portion of reaction section 10 have a constant diameter as illustrated. If desired, the downstream end portion of said reaction section can be provided with an enlarged diameter so as to provide increased residence time under carbon black producing conditions without unduly increasing the length of said reaction section. For example, in one embodiment of the furnace here illustrated, the upstream portion of reaction section 10 can have an inner diameter of 12 inches and any suitable length, e.g., up to 10 or 11 feet and the downstream portion of said reaction section can have an inner diameter of 18 inches and any suitable length, e.g., up to 10 or 11 feet. Since one foot of the 18-inch I.D. portion equals 2.25 feet of the 12-inch portion, insofar as volume is concerned, it is clear how the over-all length can be varied. The combustion chamber 14 can be 12 inches in length and have a diameter of 37 inches. The above dimensions are not critical, are merely given as an example, and any and all dimensions can be varied in the practice of the invention. However, when employing a precombustion type of furnace as illustrated in FIGURE 1, the combustion chamber 14 should have a larger diameter than the reaction section 10.

Provided along the length of reaction section 10, especially in the downstream portion thereof, are a plurality of quench liquid inlet conduits 21 and 22. Said quench liquid inlet conduits are provided for the introduction of quenching liquid, usually water in liquid phase, into the reaction section to quickly quench the reaction mixture gases to a temperature below that at which carbon black formation takes place, preferably to a temperature lower than 2000° F. Quench inlet conduits 21 and 22 as shown each comprise four such inlets (three are shown) spaced 90° apart around the circumference of section 10. Any number of inlets arranged in any suitable radial pattern can be employed. It is desirable to employ at least two inlets at each position in order to more effectively blanket the interior of the reaction section and thus more effectively quench the reaction. Each of said inlets is equipped with a suitable spray nozzle (not shown) at the inner end thereof. Said quench liquid inlet conduits can be located at any desired points along the length of the reaction section, thus providing another means for varying the effective length of the reaction section in a given furnace. The longitudinal location of the particular quench inlet conduit employed will depend upon the properties desired in the carbon black product. If the downstream end portion of reaction section 10 is enlarged in diameter as described above, said enlarged diameter portion can also be provided with a plurality of suitably spaced quench liquid inlets.

FIGURE 2 illustrates in detail one arrangement at the upstream or inlet end wall of combustion chamber 14 which is provided for the introduction of the feed hydrocarbon and jacket gas. The arrangement shown in FIGURE 2 is employed when the reactant hydrocarbon oil is not vaporized or is only partially vaporized. In this arrangement a suitable spray nozzle 25 is provided on the outlet end of feed conduit 17. FIGURE 3 illustrates another arrangement of said reactant oil and jacket gas inlet apparatus. The arrangement shown in FIGURE 3 is employed when the reactant hydrocarbon oil being used is substantially all vaporized prior to introduction into the furnace. In this arrangement the outlet end of feed conduit 17 is usually open ended as shown. In both FIGURES 2 and 3 the outlet end of annular space 19 is shown as being open. However, it is within the scope of the invention to partially close said open end of annular space 19, as by a perforated plate, so that the jacket gas is emitted as a plurality of annularly arranged jet streams instead of as an annulus.

In combustion zone 14 there are arranged the inlets 15 (see FIGURE 4) which are so disposed that gas passing therethrough and into combustion zone 14 will do so in a direction tangent to the cylindrical wall of said combustion zone 14. Each tangential gas inlet 15 consists of a small conduit 23 joining a larger conduit or tunnel 24 which terminates as an opening in the refractory liner of combustion section 14. An inlet pipe 26 for the combustible mixture of gas and air extends part way into said small conduit 23 as shown.

The furnace and apparatus just described have the general conformity and are constructed and operated generally in the manner fully described in U.S. Patent 2,564,700.

Various modifications of said furnace which can also be employed in the practice of the invention are also described in said patent. Other types of furnaces and apparatus which can also be employed in the practice of the invention are described in other patents mentioned in said Patent 2,564,700.

Referring now to FIGURE 5, there is shown another presently preferred carbon black furnace which can be employed in the practice of the invention. Said furnace comprises a substantially cylindrical elongated reaction section 30. The downstream end portion of reaction section 30 can be of enlarged diameter as described above in connection with FIGURE 1. The furnace effluent can be quenched and the carbon black collected as in the furnace of FIGURE 1. A cylindrical precombustion section 31 is disposed upstream of, in open communication with, substantially axially aligned with, and has a diameter larger than said reaction section 30. A first sleeve 32 having a diameter less than said precombustion section 31 extends into said precombustion section from the upstream end thereof to provide an annular space 33 defined by the inner wall of said precombustion chamber and the outer wall of said first sleeve. A second sleeve 34 has a smaller diameter than, and is concentrically mounted within, said first sleeve 32. Said sleeves 31 and 32 are preferably formed of a refractory material such as sillimanite, alumina, silicon carbide, or other refractory material suitable for the purpose. Refractory insulation 36 is disposed in the space between said first and second sleeves.

A fuel introduction ring 37 is disposed around said first sleeve 32 in said annular space 33 adjacent the upstream end of said precombustion section and is adapted to introduce fuel in a downstream direction into said annular space. Access for installation of fuel ring 37 is provided by means of removable plate 40 in the downstream face of flange 47. A fuel inlet conduit 38 is connected to said fuel introduction ring. An air distributing ring 39 surrounds said first sleeve and is adapted to introduce air tangentially into said annular space 33 as described further hereinafter in connection with FIGURE 7. An air inlet conduit 41 is connected to said air distributing ring.

An annular closure flange 42 having an opening therein abuts the upstream end of said first sleeve and the upstream end of said second sleeve, thereby closing the upstream end of said annular space. Support bars 43 and 43' extend from the downstream face of said closure flange into the insulation between said first ring 32 and said second ring 34. A spacer sleeve 44 is disposed between said air distributing ring and said closure flange. A plurality of bolts 46 extends through said closure flange 42, said air distributing ring 39, and into the upstream face of flange 47. A first packing gland assembly 48 is mounted on the upstream side of said closure flange around the opening provided therein. An annular cooling fluid conduit 49, provided with an internal divider fin 51, extends movably through said first packing gland assembly 48, said opening in said closure flange 42, and extends concentrically within said second sleeve 34 in spaced apart relationship therewith, preferably to a point adjacent the downstream end of said second sleeve. Cooling fluid inlet and outlet conduit means, 52 and 53 respectively, are attached to said cooling fluid conduit 49 for the introduction and removal of cooling fluid therefrom.

A jacket gas conduit 54 is fixed to and extends through a closure plate 56 mounted on the upstream end of said cooling fluid conduit, and extends concentrically within said cooling fluid conduit in spaced apart relationship therewith, preferably to a point adjacent the downstream end of said cooling fluid conduit. The spacing between the inner wall of cooling fluid conduit 49 and the outer wall of jacket gas conduit 54 is small but is sufficient to provide a dead air space which further aids in shielding said jacket gas conduit. Inlet conduit 55 is connected to said jacket gas conduit 54. A second packing gland assembly 57 is mounted at the upstream end of said jacket gas conduit. A feed reactant conduit 58 extends slidably through said second packing gland assembly 57 to a point preferably adjacent the downstream end of said jacket gas tube 54.

In FIGURE 6 air distributing ring 39 comprises an inner ring 63 and an outer ring 64 having an air conducting channel 66 formed therebetween. The supply pipe 41 is connected in communication with the air distributing channel 66 from whence it passes through generally tangential passages 67 in communication with annular space 33, the mixture of air from pipe 41 and gas from pipe 38 passing through annular space 33 and burning therein to create hot combustion gases which surround the acetylene from conduit 54 and the fluid hydrocarbon from conduit 58 as they both pass into reaction section 30. Ports or passages 67 may be made radial, in which case there will not be any substantial whirling movement, or they can be made generally tangent to the inner surface of ring 63, in which case a helical motion of the air from ports 67 and the gas from openings 60 in fuel ring 37 pass helically down space 33 and then pass spirally into reaction section 30 surrounding the acetylene from conduit 54 and the hydrocarbon from conduit 58 which are being forced axially into reaction section 30. Bolt holes 70 in ring 63 are for bolts 46 (FIGURE 5) to hold it in position against flange 47 of FIGURE 5, and said holes 70 to not connect with either channel 66 or with holes 67.

The apparatus of FIGURE 5 is particularly adapted for the introduction of a sheath of gas, such as the predominantly acetylene gas used in the practice of the invention, around a reactant hydrocarbon stream in the manner described herein. For example, the adjustable insulator comprising refractory insulation 36 can be moved in and out of precombustion section 31 by changing the length of the spacer sleeve 44. This provides one means of controlling and varying the contacting of the hydrocarbon from conduit 58 and its sheath of predominantly acetylene gas from conduit 54 with the hot combustion gases from annular space 33. The distance or spacing of the downstream end of said adjustable insulator from the upstream opening of reaction section 30 can be within the range of from one-half to three times the diameter of said reaction section. It is preferred that said spacing be from 1 to 2, more preferably from 1 to 1.5, times the diameter of said reaction section 30. The position of the cooling fluid conduit 49 within said adjustable insulator is adjustable by means of the packing gland assembly 48 shown. Although not shown in the drawing for reasons of simplifying said drawing, the position of the jacket gas conduit 54 within said cooling fluid conduit 49 can be made adjustable by installing a suitable packing gland assembly on the face of closure plate 56. As shown in the drawing, the position of the hydrocarbon feed conduit 58 is adjustable within said jacket gas conduit 54 by means of the packing gland assembly 57. The outlet end of said hydrocarbon inlet tube 58 is preferably flush with or extended slightly beyond the end of said jacket gas conduit 54, e.g., for a distance up to about 2 diameters so as to provide for the contacting of the predominantly acetylene gas by the hot combustion gases before said hot combustion gases contact the reactant hydrocarbon. When said hydrocarbon inlet tube 58 is retracted within jacket gas conduit 54 mixing of the hydrocarbon and the acetylene gas is promoted. Thus, by means of the adjustable elements of the apparatus above described, complete control over the mixing of the acetylene gas and the reactant hydrocarbon can be attained.

An apparatus essentially like that in FIGURE 5 was employed in the runs described in Example I hereinafter. In the embodiment of the apparatus there employed reaction section 30 had an internal diameter of 2 inches and was 24 inches in length. Precombustion section 31 had an internal diameter of 6.5 inches and a length of 7 inches (downstream from gas inlet ring 37). The adjustable insulator comprising refractory insulation 36 had an outside diameter of 5 inches and an internal diameter of 1.25 inches. The spacing of the downstream end of the entire feed inlet assembly comprising said adjustable insulator 36 from the upstream opening of reaction section 30 was 2⅝ inches. The above dimensions are not critical, are merely given as an example, and any and all dimensions can be varied in the practice of the invention. However, when employing a precombustion type of furnace such as that illustrated in FIGURE 5, the precombustion chamber 31 should have a larger diameter than the reaction section 30.

The following examples will serve to further illustrate the invention.

Example I

A carbon black furnace constructed essentially as shown in FIGURE 5 was used for the production of carbon black from benzene. Said furnace was operated with the precombustion burner being supplied with excess air. Process air and propane gas fuel were introduced into annular space 33, said air entering from tangential ports 67 to impart a swirling or helical motion to the combustion gases in annular space 33 which then pass spirally into reaction section 30. At steady state combustion conditions the flame anchored about two inches downstream from the gas inlet ring.

Vaporized feed hydrocarbon (benzene) was introduced along the axis of the furnace through conduit 58. Acetylene was added through the annulus provided around the feedstock conduit 58 by means of conduit 54 in a manner such that it was contacted by the precombustion gases before they came in contact with the feedstock. The amount of acetylene was regulated at or near stoichiometric with the excess air in the precombustion gases.

A series of runs was made introducing benzene and acetylene in the manner described. One control run was made without the introduction of acetylene and another control run was made in which acetylene was introduced in admixture with the benzene. Data from said runs are summarized in Table I.

A comparison of the data from the above runs in Table I shows that the carbon blacks obtained in Runs 3 to 6 when operating in accordance with the invention had a higher structure, as evidenced by the oil adsorption, than the carbon blacks obtained in either of the control Runs 1 and 2. Control Run 2 shows that when the acetylene was mixed with the benzene feed there was no increase in the structure of the carbon black product.

Example II

The carbon blacks obtained in Runs 1 and 3 of the above Example I were evaluated in rubber. The rubber used was a blend of a Cis-4(R) polybutadiene rubber and a SBR rubber. Said polybutadiene rubber was a product prepared by the polymerization of 1,3-butadiene at 41° F. in the presence of a catalyst formed on mixing triisobutylaluminum, titanium tetrachloride, and iodine. Toluene was the polymerization diluent. The polymer had a cis content of about 95 percent. Said SBR rubber was Philprene 1712, a butadiene/styrene copolymer prepared by emulsion polymerization at 41° F. using a mixed rosin acid and fatty acid soap as the emulsifier and 37.50 parts by weight of a highly aromatic processing oil per 100 parts rubber. The polymer has a bound styrene content of 23.5 weight percent and a Mooney value (ML-4 at 212° F.) of about 51.

The following compounding recipe was employed:

|  | Parts by weight |
|---|---|
| Cis-polybutadiene | 50 |
| Butadiene/styrene rubber [1] | 68.75 |
| Carbon black | 75 |
| Aromatic oil | 21.25 |
| Zinc oxide | 3 |
| Stearic acid | 2 |
| Wingstay 100 [2] | 1 |
| Stanoflex AW [3] | 2 |
| Paraffin wax | 2 |
| Sulfur | 2 |
| NOBS Special [4] | 1.2 |

[1] Rubber, 50 parts; oil, 18.75 parts.
[2] Mixture of diaryl-p-phenylene diamines.
[3] Condensation product of p-phenetidine and acetone.
[4] N-oxydiethylene-2-benzothiazyl sulfenamide.

The stocks were milled, cured 30 minutes at 307° F., and physical properties determined. The following results were obtained:

|  | Carbon Black From Run 1 | Carbon Black From Run 3 |
|---|---|---|
| Crosslink density, $\mu \times 10^4$ moles/cc.[1] | 1.46 | 1.54 |
| 300% Modulus, p.s.i.[2] | 1,695 | 1,865 |
| Tensile, p.s.i.[2] | 2,510 | 2,640 |
| Elongation, percent [2] | 405 | 395 |
| $\Delta T$, °F.[3] | 52.9 | 53.6 |
| Resilience, percent [4] | 65.9 | 66.8 |
| Shore A hardness [5] | 63 | 65 |
| Oven aged 24 hours at 212° F.: |  |  |
| 200% Modulus, p.s.i.[2] | 1,390 | 1,610 |
| Tensile, p.s.i.[2] | 2,310 | 2,470 |
| Elongation, percent [2] | 290 | 270 |
| $\Delta T$, °F.[3] | 50.0 | 50.6 |
| Resilience, percent [4] | 68.3 | 69.7 |

[1] Rubber World 135, 67–73, 254–260 (1956).
[2] ASTM D-412-61T. Scott Tensile Machine L-6. Tests made at 80° F. unless otherwise specified.
[3] ASTM D-623-58. Method A, Goodrich Flexometer, 143 lb./sq. in load, 0.175-inch stroke. Test specimen is is a right circular cylinder 0.7 inch in diameter and one inch high.
[4] ASTM D-945-59 (modified). Yerzley oscillograph. Test specimen is a right circular cylinder 0.7 inch in diameter and one inch high.
[5] ASTM D-676-59T. Shore Durometer, Type A.

The above data show the carbon black from Run 3 produced in accordane with the invention imparted a higher modulus to the rubber than did the control carbon black from Run 1.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for producing a furnace carbon black product having increased structure characteristics, which process comprises: establishing and maintaining in a furnace a zone of hot combustion gases formed by burning a fuel with a free oxygen-containing gas; introducing into said zone a stream of hydrocarbon feedstock; in-

TABLE I

| Run No. | Production of Combustion Gases | | | Benzene Feed | | $C_2H_2$ [1] | | Carbon Black Product | | |
|---|---|---|---|---|---|---|---|---|---|---|
|  | Propane Fuel, S.c.f./hr. | Air | | Temp., °F. | Gal./hr. | S.c.f./hr. | How added | Yield,[2] Wt. percent | $N_2$ Surface Area, m.²/g. | Oil Absorp., cc./g. |
|  |  | S.c.f./hr. | Percent of Stoichiometric |  |  |  |  |  |  |  |
| 1 | 34.5 | 1,226 | 151 | 500 | 2.08 | 0 | | 59.0 | 83 | 1.42 |
| 2 | 34.6 | 1,218 | 150 | 390 | 2.00 | 34.8 | Mixed with benzene | 59.8 | 80 | 1.42 |
| 3 | 34.8 | 1,219 | 149 | 550 | 2.02 | 41.7 | Annulus around benzene | 59.1 | 91 | 1.54 |
| 4 | 34.7 | 1,219 | 149 | 520 | 2.03 | 41.7 | ____do____ | 58.8 | 84 | 1.52 |
| 5 | 34.7 | 1,219 | 149 | 520 | 1.96 | 33.8 | ____do____ | 56.9 | 84 | 1.54 |
| 6 | 34.6 | 1,219 | 149 | 520 | 1.96 | 52.2 | ____do____ | 58.9 | 84 | 1.56 |

[1] 33.8 s.c.f./hr. of acetylene is stoichiometric to $CO_2+H_2O$ for the excess air in combustion gases.
[2] Wt. percent of carbon in benzene plus acetylene.

troducing around said stream of hydrocarbon feedstock a sheath of a predominantly acetylene gas; forming carbon black from said hydrocarbon feedstock by pyrochemical action due to the heat of said hot combustion gases, and separating the resulting carbon black product from the resulting gaseous products of said process, said carbon black product having higher structure characteristics than the carbon black normally produced from said feedstock.

2. In a carbon black producing process of the tangential flame type wherein a stream of carbonaceous reactant is axially introduced into a helically traveling body of hot combustion gases in a carbon black furnace and is partially burned under carbon black producing conditions to produce a carbon black product, the improvement which comprises: introducing a hydrocarbon feedstock into said combustion gases; introducing a predominantly acetylene gas stream as a separate stream surrounding said hydrocarbon feedstock; and recovering from the effluent from said furnace a carbon black product having higher structure characteristics than the carbon black normally produced from said feedstock.

3. A process for producing a furnace carbon black product having increased structure characteristics, which process comprises: establishing and maintaining in a furnace a zone of hot combustion gases formed by burning a fuel gas with an excess of a free oxygen-containing gas; introducing into said zone a stream of hydrocarbon feedstock; introducing around said stream of hydrocarbon feedstock a sheath of a predominantly acetylene gas; forming carbon black from said hydrocarbon feedstock by pyrochemical action due to the heat of said hot combustion gases, and separating the resulting carbon black product from the resulting gaseous products of said process.

4. A process according to claim 3 wherein said predominantly acetylene gas is introduced in an amount within the range of from 10 to 45 s.c.f. per gallon of said feedstock.

5. A process according to claim 4 wherein said predominantly acetylene gas is introduced in an amount within the range of from substantially stoichiometric to 200 percent of stoichiometric with respect to the excess oxygen in said free oxygen-containing gas.

6. A process according to claim 5 wherein said predominantly acetylene gas consists essentially of acetylene.

7. A process according to claim 6 wherein said hydrocarbon feedstock is benzene.

8. A process for producing a modified furnace carbon black product from a normally liquid hydrocarbon feedstock having a BMCI value of at least 80, said carbon black having structure characteristics higher than the carbon black normally produced from said feedstock, which process comprises: establishing and maintaining a spiraling body of hot combustion gases in a generally cylindrical carbon black furnace, said combustion gases being formed by burning a fuel gas with an excess of a free oxygen-containing gas; introducing a stream of said feedstock axially into said combustion gases; introducing a separate stream of a gas containing at least 60 volume percent of acetylene, as a sheath surrounding said stream of feedstock and in an amount sufficient to supply from 10 to 45 s.c.f. of acetylene per gallon of said feedstock, said amount of said acetylene-containing gas being sufficient to be at least stoichiometric with respect to the excess oxygen in said free oxygen-containing gas; thermally decomposing said feedstock in said furnace under carbon black producing conditions to produce said carbon black product; and recovering said carbon black product from the effluent from said furnace.

9. A process according to claim 8 wherein said acetylene-containing gas stream contains up to 40 volume percent of ethylene and not more than 5 volume percent of $C_1$ to $C_3$ saturated hydrocarbons.

10. A process for producing from a normally liquid hydrocarbon feedstock a carbon black having higher than normal modulus properties in rubber, which process comprises: establishing and maintaining a spiraling mass of hot combustion gases in a cylindrical first zone having a diameter greater than its length by injecting tangentially thereinto previously produced hot combustion gases; introducing a hydrocarbon feedstock into said first zone along the axis thereof; introducing an annular stream of a predominantly acetylene gas as a separate stream surrounding said feedstock; continuously passing said hydrocarbon feedstock surrounded by said hot combustion gases and said predominantly acetylene gas axially into a cylindrical second zone the length of which is greater than its diameter and the diameter of which is less than that of said first zone, said second zone being in communication with and in axial alignment with said first zone; forming carbon black from said hydrocarbon feedstock by pyrochemical action due to the heat of the surrounding hot combustion gases; and separating said carbon black from the resultant gaseous products of said process.

11. In a process for producing a furnace carbon black, which process comprises continuously introducing hot combustion gases formed by burning a fuel gas with an excess of a free oxygen-containing gas tangentially into a first cylindrical zone having a diameter greater than its length and passing said gases spirally inward toward the longitudinal axis of said first zone, continuously passing said gases while so rotating into a second cylindrical zone the length of which is greater than its diameter and the diameter of which is less than that of said first zone, said second zone being in communication with and in axial alignment with said first zone whereby a helical movement of said gases is provided along the inner surface of said second zone, continuously introducing a hydrocarbon feedstock along the axis of said first zone and passing it axially into the center of said helically moving gases in said second zone, forming carbon black from said hydrocarbon feedstock by pyrochemical action due to the heat of the surrounding hot combustion gases, and separating said carbon black from the resultant gaseous products of said process; the improvement comprising: continuously introducing as said feedstock a normally liquid hydrocarbon feedstock having a BMCI value of at least 80; continuously introducing a separate stream of a predominantly acetylene gas, in an amount sufficient to be at least stoichiometric with respect to the excess oxygen in said free oxygen-containing gas, coaxially with and as a sheath surrounding said hydrocarbon feedstock; and recovering from the effluent from said second zone a carbon black product having higher structure characteristics than would normally be produced from said feedstock.

References Cited

UNITED STATES PATENTS

| | | | |
|---|---|---|---|
| 2,852,345 | 8/1958 | Rushford | 23—209.4 |
| 2,961,300 | 11/1960 | Dollinger | 23—209.4 |
| 3,211,532 | 10/1965 | Henderson | 23—259.5 |
| 3,235,334 | 2/1966 | Kelmers | 23—209.4 |

EDWARD J. MEROS, *Primary Examiner.*